United States Patent [19]
Seidl

[11] Patent Number: 5,431,183
[45] Date of Patent: Jul. 11, 1995

[54] FLOW REGULATOR VALVE

[75] Inventor: Günther Seidl, Heubach, Germany

[73] Assignee: ZF Friedrichshafen, AG., Friedrichshafen, Germany

[21] Appl. No.: 167,872

[22] PCT Filed: Jun. 16, 1992

[86] PCT No.: PCT/EP92/01358
§ 371 Date: Dec. 17, 1993
§ 102(e) Date: Dec. 17, 1993

[87] PCT Pub. No.: WO93/00514
PCT Pub. Date: Jan. 7, 1993

[30] Foreign Application Priority Data
Jun. 20, 1991 [DE] Germany .................. 41 20 360.7

[51] Int. Cl.⁶ .............................................. G05D 7/01
[52] U.S. Cl. .................................. 137/117; 137/539.5; 417/304
[58] Field of Search ........................ 137/117, 539.5; 417/304

[56] References Cited
U.S. PATENT DOCUMENTS

| 2,395,824 | 3/1946 | Herman . | |
|---|---|---|---|
| 3,366,065 | 1/1968 | Pace et al. | 417/304 X |
| 3,433,240 | 3/1969 | Lehmann | 417/304 X |
| 3,656,870 | 4/1972 | Kusakabe et al. . | |

*Primary Examiner*—Robert G. Nilson
*Attorney, Agent, or Firm*—Albert M. Zalkind

[57] ABSTRACT

A flow regulator valve that is intended particularly for positive-displacement pumps for auxiliary power steering systems in motor vehicles contains in a valve borehole (1) a flow regulator piston (3) that is guided in an axially movable and sealing manner. Inside flow regulator piston (3), there is arranged a pressure limiting valve (18) whose closing body (19) is pressed against a valve seat (22) by the force of a spring (21). The force of spring (21) is adjusted by a headless pin (23) which—in its adjusted position—is secured with respect to flow regulator piston (3) by a locknut (25).

2 Claims, 1 Drawing Sheet

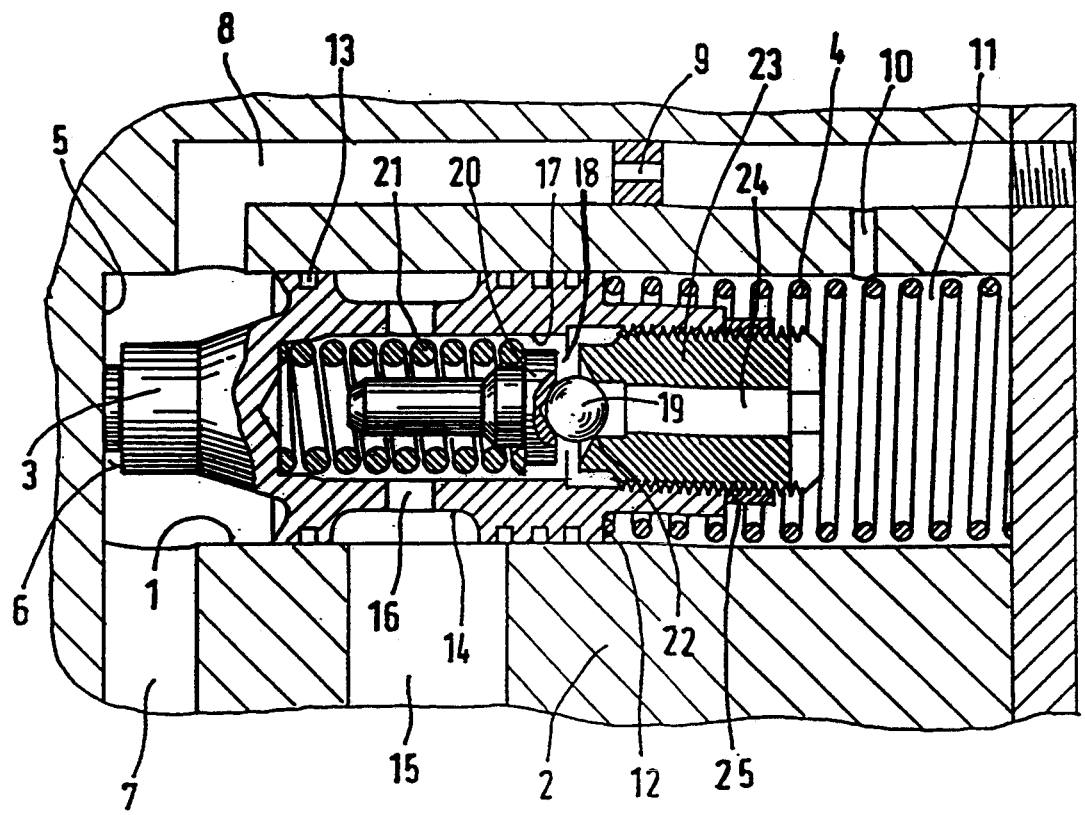

FLOW REGULATOR VALVE

This invention relates to a flow regulator valve, in particular, for positive-displacement pumps used in auxiliary power steering systems in motor vehicles, according to the preamble of claim 1. A flow regulating piston is guided in a sealing manner in a valve borehole. Arranged inside the flow regulator piston is a pressure limiting valve whose closing body is forced against a valve seat by the force of a spring. The spring force can be adjusted by a setting screw.

Such a valve is known from U.S. Pat. No. 3,366,065. In this particular flow regulator valve, the spring force, and thus also the opening pressure of the flow regulator valve, are adjusted by a setting screw. The setting value of the spring force is determined by discs that are inserted between a collar of the setting screw and a front surface of the flow regulator piston. To secure the setting screw against being twisted out, the setting screw must be tightened with a certain torque. The required torque is so great here that the flow regulator piston is deformed. The flow regulator piston can become stuck in the valve borehole due to this deformation of the outside circumferential surface of the flow regulator piston. There must be a relatively great minimum play between the valve borehole and the flow regulator piston to prevent it from getting stuck. This great play leads to a high leakage oil loss between the flow regulator piston and the valve borehole and thus reduces the hydraulic efficiency of the pump. The large leakage oil portion furthermore causes a relatively great hysteresis in connection with the feed flow characteristic.

The task of the invention is to create a flow regulator valve in which the above-mentioned disadvantages are avoided. In particular, the flow regulator piston is not to be deformed when the flow regulator valve is adjusted.

This problem is solved by-the flow regulator valve characterized in claim 1. To provide this solution, in particular, the setting screw is made in the form of a headless pin which—when it is in its adjusted position—is secured with respect to the flow regulator piston by a locknut.

If, in a flow regulator valve according to the invention, the locknut is tightened with a torque that—in terms of its magnitude—corresponds to the torque applied during the adjustment of the known flow regulator valve, then the deformation is distributed over these two parts, depending on the dimensions of the flow regulator piston and the locknut. As a result, the flow regulator piston is deformed considerably less, so that one needs an essentially smaller minimum play between the flow regulator piston and the valve borehole.

Here it is particularly advantageous when the locknut has a smaller cross-section than the flow regulator piston in the area in which the headless pin is screwed in. This makes it possible to have the deformation—which takes place during the fixing of the setting screw—absorbed completely by the locknut. Another advantage is represented by the fact that the opening pressure of the pressure limiting valve can be set phaselessly. This is made possible by the fact that the setting discs between the setting screw and the flow regulator piston are omitted.

The invention will be explained in greater detail below with the help of a practical example illustrated in the drawing. The drawing shows a longitudinal profile through the flow regulator valve according to the invention.

A flow regulator piston 3 is guided in an axially movable and sealing manner in a valve borehole 1 of a valve housing 2. Flow regulator piston 3 is pressed—to the left, in the drawing—against a housing stop 5 by a spring 4. The left front surface 6 of flow regulator piston 3 is impacted by the pressure from a pressure line 7. A working line 8 leads from pressure line 7 to a consumer, not illustrated. A flow regulator choke 9 is arranged in working line 8. The pressure, prevailing behind the flow regulator choke 9, is supplied via an attenuation choke 10 to a chamber 11 that contains spring 4 and that is limited by the right front surface 12 of flow regulator piston 3.

Flow regulator piston 3 has several sealing grooves 13 along its outer circumferential surface. A circumferential groove 14 of flow regulator piston 3 is connected to a return line 15. Boreholes 16 lead from circumferential groove 14 to an axial borehole 17 that is located inside flow regulator piston 3.

A pressure limiting valve 18 is arranged in axial borehole 17. A closing body 19 of the pressure limiting valve is made in the form of a ball in the practical example illustrated. Closing body 19 is pressed against a valve seat 22 via a ball holder 20 by a spring 21. Valve seat 22 is arranged on a headless pin 23 that serves as setting screw for the pressure limiting valve 18. A borehole 24 leads to chamber 11 from valve seat 22.

Headless pin 23 is secured with respect to flow regulator piston 3 by a locknut

Locknut 25, for example, is a hexagonal nut whose smallest cross-section is illustrated in the drawing. This, overall, results in a cross-section of the locknut 25 that is smaller than the cross-section of flow regulator piston 3 in the area in which headless pin 23 is screwed in. As a result, the entire deformation—which is generated during the fixing of headless pin 23—is absorbed by locknut 25.

In the flow regulator valve according to the invention, it is very easily possible to set the pressure of the integrated pressure limiting valve in a phaseless manner because headless pin 23 can be fixed in any desired position by locknut 25. An additional advantage results from the possibility of adjusting the pressure limiting valve to the desired pressure on an assembly test stand in a fully automatic fashion. This facilitates a very tight tolerance setting for the opening pressure of the pressure limiting valve.

| References |
|---|
| 1 Valve borehole |
| 2 Valve housing |
| 3 Flow regulator piston |
| 4 Spring |
| 5 Housing stop |
| 6 Front surface |
| 7 Pressure line |
| 8 Working line |
| 9 Flow regulator choke |
| 10 Attenuation choke |
| 11 Chamber |
| 12 Front surface |
| 13 Sealing groove |
| 14 Circumferential groove |
| 15 Return line |
| 16 Borehole |
| 17 Axial borehole |
| 18 Pressure limiting valve |
| 19 Closing body |

-continued

| References |
|---|
| 20 Ball holder |
| 21 Spring |
| 22 Valve seat |
| 23 Headless pin |
| 24 Borehole |
| 25 Locknut |

We claim:

1. Flow regulator valve, particularly for positive-displacement pumps used in auxiliary power steering systems in motor vehicles, with a flow regulator piston (3) that is guided in an auxiliary movable and sealing manner in a valve borehole (1) and with a pressure limiting valve (18) that is arranged inside flow regulator piston (3) and whose closing body (19) is forced against a valve seat (22) by the force of a spring (21) with the force of spring (21) being adjusted by a setting screw, wherein the setting screw is made in the form of a headless pin (23) that is secured in its adjusted position with respect to flow regulator piston (3) by a locknut (25) having a smaller cross-section than the flow regulator piston (3) in the area in which headless pin (23) is screwed in.

2. Flow regulator valve, particularly for positive-displacement pumps used in auxiliary power steering systems in motor vehicles, with a flow regulator piston (3) that is guided in an auxiliary movable and sealing manner in a valve borehole (1) and with a pressure limiting valve (18) that is arranged inside flow regulator piston (3) and whose closing body (19) is forced against a valve seat (22) by the force of a spring (21) with the force of the spring (21) being adjusted by a setting screw, wherein the setting screw is made in the form of a headless pin (23) that is secured in its adjusted position with respect to flow regulator piston (3) by a locknut (25), the locknut being tightened with a torque of a magnitude corresponding to that of a torque applied during adjustment of the flow regulator valve.

* * * * *